(12) United States Patent
Vlaskamp et al.

(10) Patent No.: US 12,406,602 B2
(45) Date of Patent: Sep. 2, 2025

(54) DISPLAY METHOD FOR CONTROLLING BRIGHTNESS ADAPTATION FOR HEAD-MOUNTED DISPLAY DEVICES

(71) Applicant: Microsoft Technology Licensing, LLC, Redmond, WA (US)

(72) Inventors: Bjorn Nicolaas Servatius Vlaskamp, Seattle, WA (US); Katri Maria Olkkonen Saarela, Helsinki (FI); Michaela Porubanova, Seattle, WA (US); Jacob Elliott Hadnett-Hunter, Ely (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/184,539

(22) Filed: Mar. 15, 2023

(65) Prior Publication Data
US 2024/0312376 A1    Sep. 19, 2024

(51) Int. Cl.
*G09G 3/00* (2006.01)
*G02B 27/00* (2006.01)
*G02B 27/01* (2006.01)

(52) U.S. Cl.
CPC ......... *G09G 3/001* (2013.01); *G02B 27/0093* (2013.01); *G02B 27/0172* (2013.01); *G02B 2027/0112* (2013.01); *G09G 2320/028* (2013.01); *G09G 2320/0633* (2013.01)

(58) Field of Classification Search
None
See application file for complete search history.

(56) References Cited

U.S. PATENT DOCUMENTS

| | | | |
|---|---|---|---|
| 10,331,207 B1 | 6/2019 | Simmons | |
| 10,997,948 B2 | 5/2021 | Chen | |
| 2016/0270656 A1* | 9/2016 | Samec | A61B 5/14555 |
| 2018/0275410 A1* | 9/2018 | Yeoh | G06T 19/006 |
| 2019/0011703 A1* | 1/2019 | Robaina | A61B 90/36 |
| 2019/0041642 A1* | 2/2019 | Haddick | G06F 1/163 |
| 2023/0213766 A1* | 7/2023 | Imamura | G02B 27/0172 |
| | | | 345/8 |

OTHER PUBLICATIONS

Belenkii, et al., "Head-worn display for control of unmanned vehicles," In Unmanned Systems Technology XIX, May 5, 2017, vol. 10195, 10 pages.
International Search Report and Written Opinion received for PCT Application No. PCT/US2024/019277, Jun. 14, 2024, 14 pages.
Kooijman, et al., "Effect of a background on foveal and parafoveal cone dark adaptation," Vision Research, Jan. 1, 1978, vol. 18, Issue No. 10, pp. 1381-1385.

* cited by examiner

*Primary Examiner* — Amr A Awad
*Assistant Examiner* — Donna V Bocar
(74) *Attorney, Agent, or Firm* — Alleman Hall & Tuttle LLP (57) ABSTRACT

A method of operation of a display device for controlling brightness adaptation comprises (a) receiving a position signal that varies in dependence on a position of a fovea of an eye; (b) receiving a brightness signal that varies in dependence on brightness external to the display device; and (c) projecting a color image into the eye over a range of angles that varies in dependence on the position signal and on the brightness signal, such that when the brightness is below a predetermined threshold the color image is confined to the retinal target area.

19 Claims, 9 Drawing Sheets

DISPLAY METHOD FOR CONTROLLING BRIGHTNESS ADAPTATION FOR HEAD-MOUNTED DISPLAY DEVICES

BACKGROUND

Near-eye display technology has evolved in recent years to become an emerging consumer technology. In head-worn display devices, for example, binocular near-eye display provides 3D stereo vision for virtual-reality (VR) presentation. When implemented using see-thru optics or pass-thru video, near-eye display enables mixed- or augmented-reality (AR) presentation, in which VR elements are admixed into the user's natural field of view.

SUMMARY

One aspect of this disclosure relates to a method of operation of a display device for controlling brightness adaptation. The method comprises (a) receiving a position signal that varies in dependence on a position of a fovea of an eye; (b) receiving a brightness signal that varies in dependence on brightness external to the display device; and (c) projecting a color image into the eye over a range of angles that varies in dependence on the position signal and on the brightness signal, such that when the brightness is below a predetermined threshold the color image is confined to a retinal target area.

Another aspect of this disclosure relates to a display device comprising a position sensor, a brightness sensor, an expansion optic, a computer, and a plurality of light emitters each emitting in a different wavelength band. The position sensor is configured to furnish a position signal that varies in dependence on a position of a fovea of an eye. The brightness sensor is configured to furnish a brightness signal that varies in dependence on brightness external to the display system. The image projector is configured to project a color image into the eye by directing the emission from the plurality of light emitters through the expansion optic. The computer is coupled operatively to the image projector and configured to cause the image projector to restrict the color image to a range of angles that varies in dependence on the position signal and on the brightness signal, such that when the brightness is below a predetermined threshold the color image is confined to a retinal target area.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

AR and VR technology continue to expand into new application areas, where operating conditions may be less predictable or controlled than in typical gaming scenarios. When a user operates an AR display device in a dark environment, for instance, the user's eyes naturally adapt to the brightness of the virtual display imagery. If the user removes the device while still in the dark environment, he or she may experience an unacceptably long episode of night blindness.

This disclosure presents a novel approach to address the above issue and thereby enhance the comfort and safety of the user. In the methods here disclosed, the display device dynamically adjusts the angular content of the virtual-image projection as a function of the ambient brightness. Under very dark ambient conditions the display projection is restricted to a narrow range of angles that focus entirely on the user's fovea or other retinal target area. Accordingly the most sensitive photoreceptors of the user's eyes, which are located outside of the fovea, are protected from the display light and remain fully dark-adapted. When the user removes the display device, those photoreceptors immediately provide acceptable night vision, almost as though the user had not been viewing any display imagery at all. Under brighter ambient conditions, projection may be provided over the full range of angles supported by the near-eye display hardware. Significantly, this approach does not deprive the user of the benefits of full-color virtual display.

Figure 1:
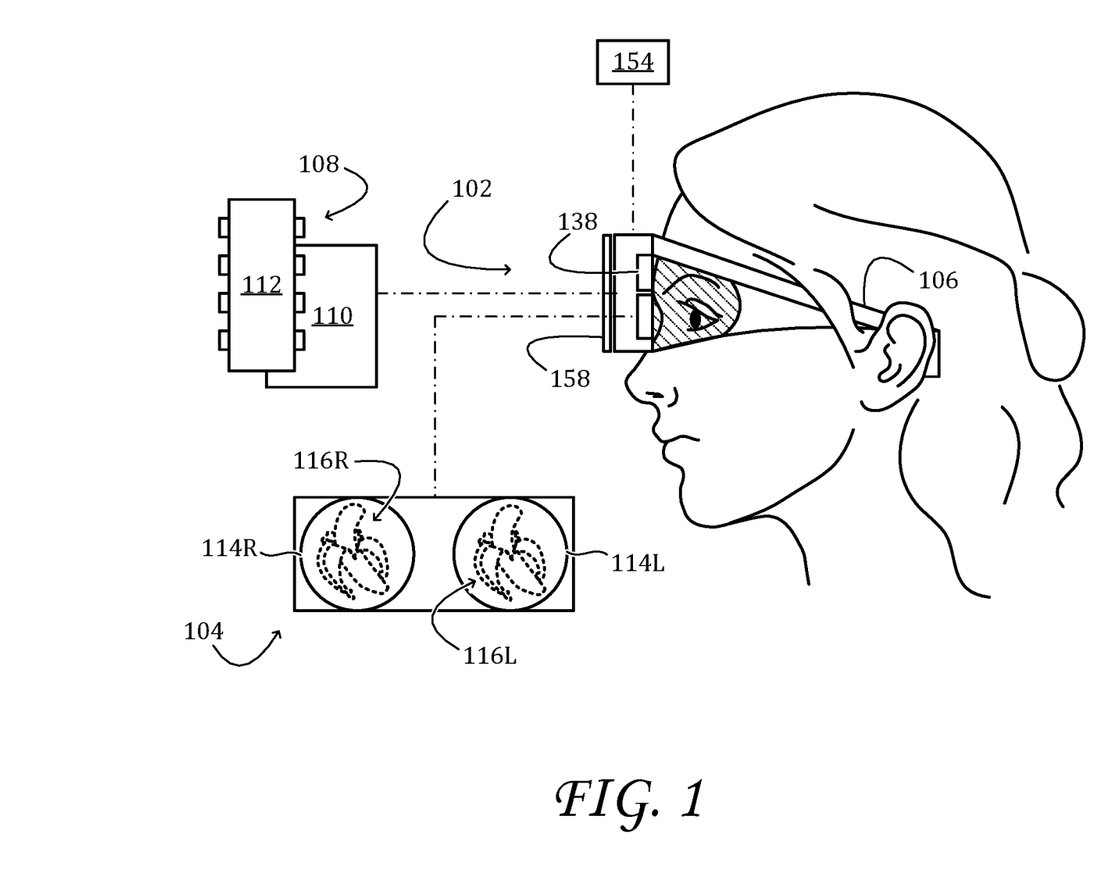
FIG. 1 shows aspects of an example display device with an integrated near-eye display system.

Turning now to the drawings, FIG. 1 shows aspects of an example display device 102. The display device is configured to be worn by a user and to project virtual imagery into the user's field of view (FOV). In this manner the display device creates an augmented or virtual reality for the benefit of the user. In the example shown in FIG. 1, display device 102 is an augmented-reality (AR) display device having a see-thru, near-eye display system 104 coupled to head-worn frame 106.

Near-eye display system 104 is configured to display still or moving images in the user's FOV. In some examples, the near-eye display system presents computer-generated, holographic imagery with which the user may interact (e.g., manipulate). To support these functions, inter alia, display device 102 includes an onboard computer 108 having a processor 110 and associated computer memory 112. In the example shown in FIG. 1, head-worn frame 106 takes the form of a visor. In other examples the head-worn frame may take the form of goggles, a helmet, or safety glasses, etc.

Near-eye display system 102 is configured for binocular image display. To that end, the near-eye display system includes a right monocular system 114R that presents a right display image 116R in front of the user's right eye, and a left monocular system 114L that presents a left display image 116L in front the user's left eye. For stereoscopic display the right and left display images may be configured with stereo disparity (vide infra) appropriate to display a three-dimensional subject or scene.

Figure 2:
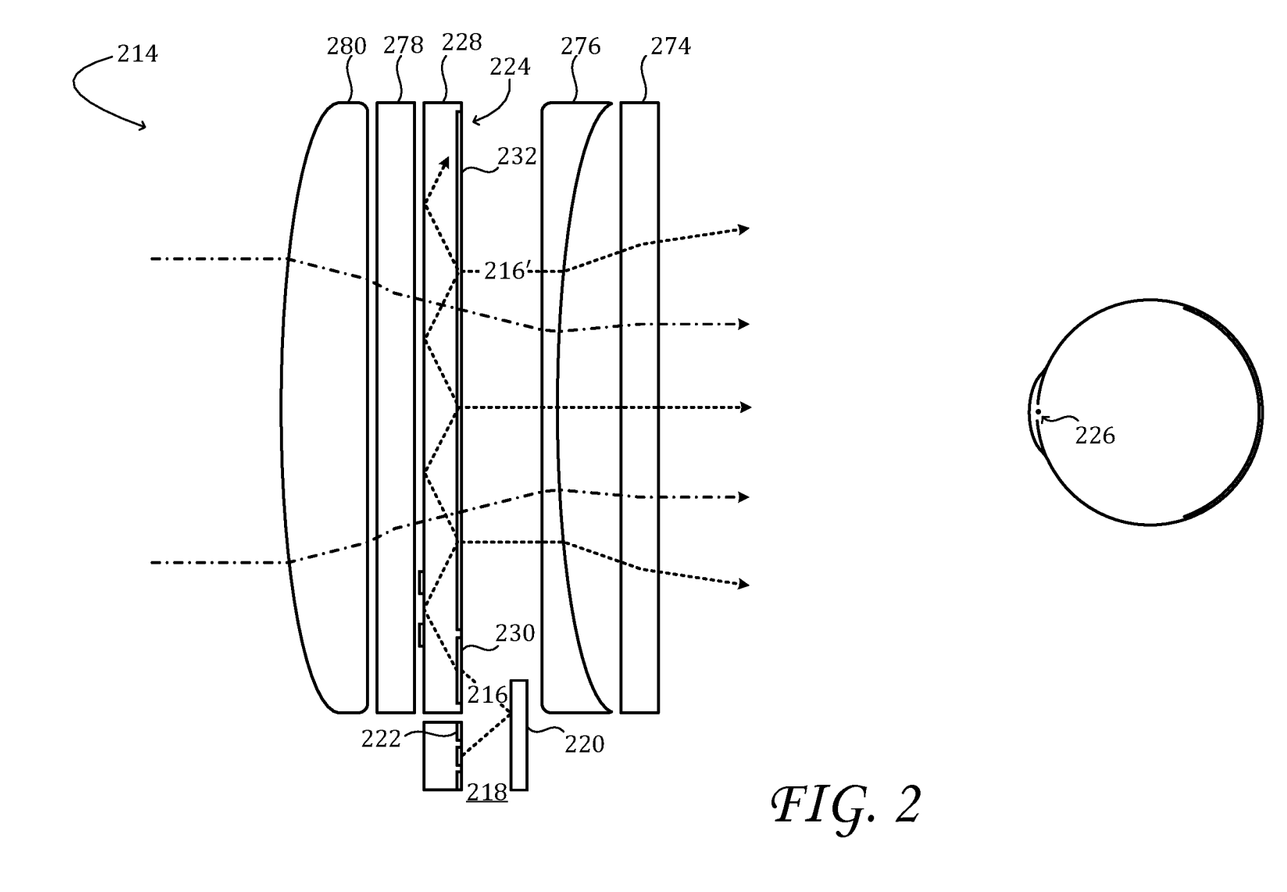
FIG. 2 shows aspects of an example monocular system of a near-eye display system.

FIG. 2 shows aspects of an example monocular system 214 of a near-eye display system. The monocular system includes an image projector 218 configured to form a display image 216. The image projector as illustrated includes a high-resolution spatial light modulator (SLM) 220 illuminated by a plurality of light emitters 222. Each light emitter may emit light of a different wavelength band. Typically the different wavelength bands correspond to the 'primary' colors. Thus, the plurality of light emitters may include at least one blue emitter emitting at wavelengths within a range of 450 to 495 nanometers (nm), at least one green emitter emitting at wavelengths within a range of 500 to 570 nm, and at least one red emitter emitting at wavelengths within a range of 620 to 750 nm. The light emitters may comprise light-emitting diodes (LEDs) or laser diodes, for instance.

SLM 220 may comprise a liquid-crystal-on-silicon (LCOS) array or digital micromirror device (DMD), for example. As used herein, the term 'LCOS' refers to an LCOS array (the optical component), as opposed to an LCOS display (which would have integrated emitters). The SLM and the light emitters are coupled operatively to a controller—viz., computer 108 of FIG. 1. The computer controls the matrix of independent, light-directing pixel elements of the SLM so as to cause the SLM to modulate the light received from the light emitters and thereby form display image 216. By controlling the light modulation temporally as well as spatially, the computer may cause the image projector to project a synchronized sequence of display images (i.e., video). In the example shown in FIG. 2, the display image is formed by reflection from the SLM. In other examples, a display image may be formed by transmission through a suitably configured, transmissive SLM. Image projectors based on other technologies are equally envisaged-organic LED arrays, micro-LED (µLED) arrays, scanned-beam laser projectors, etc.

In monocular system 214, display light from image projector 218 passes through a physical aperture of finite size. Optics downstream of the image projector focus the display light onto the anatomical right or left pupil of the user. In doing so, the downstream optics direct the display light through an entry pupil, defined as the image of the physical aperture at the anatomical-pupil position. Due to the small size of the physical aperture and/or other features of monocular system 214, the entry pupil may be too small to align reliably to the user's anatomical pupil. Accordingly, monocular system 214 includes an expansion optic 224, also called a 'pupil-expansion optic'. The image projector is configured to project an image into the user's eye by directing emission from the plurality of light emitters 222 through the expansion optic. The expansion optic is configured to receive display light through a relatively small entry pupil and to release the display light over an expanded exit pupil, which may be large enough to cover the entire area over which the user's pupil is likely to be. Such an area is called an 'eyebox'. In examples in which the near-eye display system is a see-thru system the expansion optic may be a see-thru optic.

Expansion optic 224 is configured to receive display image 216 from image projector 218 and to release an expanded form 216' of the display image toward the pupil position 226. In the illustrated example, the expansion optic includes an optical waveguide 228, an entry grating 230 and an exit grating 232. The expansion optic may also include other gratings not shown in FIG. 2. It will be understood that the term 'grating' is broadened herein to include any kind of diffractive optical element (DOE), irrespective of whether that element includes a pattern of elongate diffractive features. Non-limiting example gratings include a surface-relief type grating comprising a series of closely spaced channels formed on the optical waveguide, or a volume grating or index-modulated grating formed in the optical-waveguide material.

Entry grating 230 is a diffractive structure configured to receive display image 216 and to couple the light of the display image into optical waveguide 228. After coupling into the optical waveguide, the display light propagates through the optical waveguide by total internal reflection (TIR) from the front and back faces of the optical waveguide. Exit grating 232 is a diffractive structure configured to controllably release the propagating display light from the optical waveguide in the direction of pupil position 226. To that end, the exit grating includes a series of light-extraction features arranged from weak to strong in the direction of display-light propagation through the optical waveguide, so that the display light is released at uniform intensity over the length of the exit grating. In this manner, expansion optic 224 may be configured to expand the exit pupil of image projector 218 so as to fill or slightly overfill the eyebox of the user. This condition provides desirable image quality and user comfort.

In some examples, expansion optic 224 may expand the exit pupil of image projector 218 in one direction only—e.g., the horizontal direction, in which the most significant eye movement occurs. Here, the image projector itself may offer a large enough exit pupil-natively, or by way of a vertical pre-expansion stage—so that vertical expansion within the optical waveguide is not necessary. In other examples, expansion optic 224 may be configured to expand the exit pupil in the horizontal and vertical directions. In such examples, display light propagating in a first direction within the optical waveguide may encounter a turning grating (not shown in FIG. 2) having a plurality of diffraction features arranged weak to strong in a first direction. The turning grating may be configured such that the light diffracted by the diffraction features is turned so as to propagate in a second direction, having now been expanded in the first direction. Parallel rays of the expanded light then encounter exit grating 232 and are out-coupled from the waveguide as described above. Despite the utility of diffractive optical elements for coupling light into and out of an optical waveguide, in-coupling and out-coupling optical elements based on reflection, refraction, and/or scattering are also envisaged, as alternatives to DOEs.

Generally speaking, a display device can be used over a broad range of ambient-brightness conditions. During normal use the user's eyes adapt dynamically to the combined brightness of the ambient light plus the virtual-image projection. The diameters of the user's pupils may adjust within one second to an abrupt change in brightness, but the sensitivity of the user's retinal photoreceptors may take minutes to adjust. The relatively long time scale of photoreceptor-sensitivity adjustment can be problematic when the user, adapted to the luminance of a virtual-image projection, must remove the display device at night or in a dark space. In that scenario, the user may experience night blindness for a period of minutes, until the photoreceptors have re-adjusted to dark conditions.

Figure 3A:
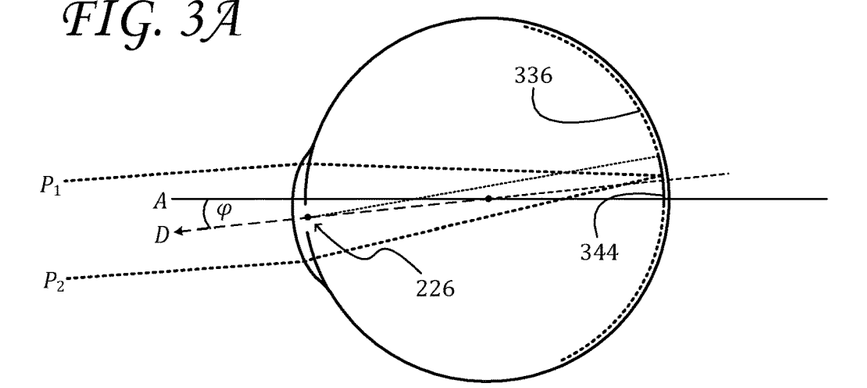
FIG. 3A shows aspects of an example human eye.
Figure 3B:
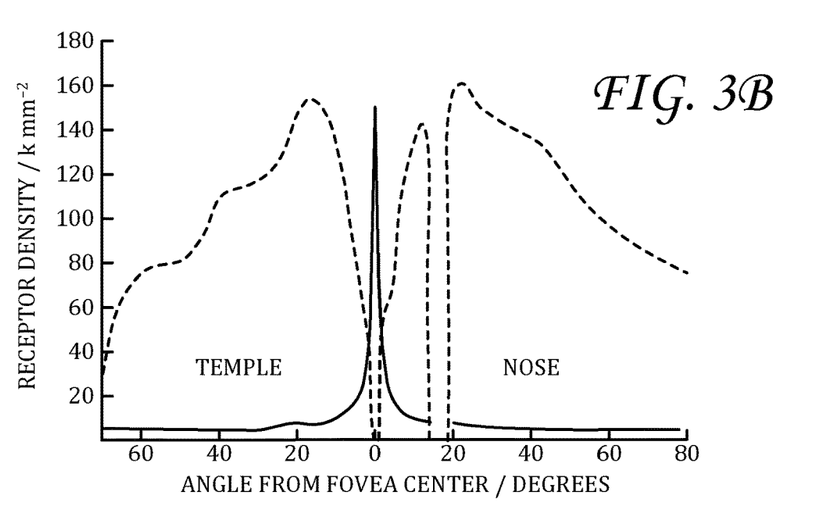
FIG. 3B is an example plot of photoreceptor areal density versus angle from the fovea center, for a human eye.
Figure 3C:
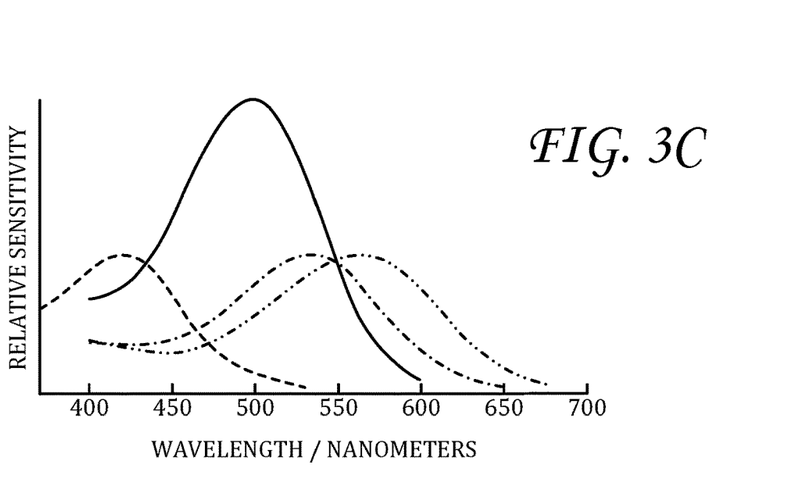
FIG. 3C is an example plot of sensitivity versus wavelength for four different photoreceptors in a human eye.

The solutions herein recognize that the human eye has two classes of retinal photoreceptors, which differ both in wavelength sensitivity and in spatial distribution over the retina. Turning now to FIGS. 3A-C, three species of cones are distributed primarily within fovea 334. The dashed lines in FIG. 3B show the collective areal cone density as a function of angle from the fovea center. As shown in FIG.

3C, each cone species responds to a different wavelength band. The sensitivity of the S-type cones (dashed line) peaks in the blue (short-wavelength) region. The sensitivity of the M-type cones (dot-dashed line) peaks in the green (mid-wavelength) region. The sensitivity of the L-type cones (double-dot dashed line) peaks in the red (long-wavelength) region. Collectively the cones provide broadband sensitivity across the visible spectrum. In comparison, the rods (solid line) have much greater sensitivity to short wavelengths than any cone species and are distributed primarily on the retinal periphery 336, outside of the fovea. In FIG. 3C, the cone sensitivities are scaled to the same peak value because the effective sensitivity depends also on the densities of each cone species, which may vary. Moreover, the relative sensitivities of the rods versus cones is not necessarily represented to scale.

In view of the limited red sensitivity of the rods, one way to avoid night blindness in the scenario above would be to limit the virtual-display imagery to long wavelengths (e.g., >620 nm), where the rods are unresponsive. That tactic would spare the highly sensitive rods from undergoing brightness adaptation; when the user removes the display device, the rods would already be adapted to dark conditions. Despite this benefit, the tactic of displaying only red light may be undesirable in other respects, as it deprives the user of the information content of full-color display. The inventors herein have recognized that a better solution overall is to project a full-color virtual display image, but confined to a retinal target area. The retinal target area can be fovea 334, in some examples, or an area that somewhat circumscribes the fovea. In this manner, practically none of the user's rods are subjected to undesired brightness adaptation. When the display device is removed, practically all of the rods remain dark-adapted and are immediately poised for night vision.

As shown in FIG. 3A, the user's gaze direction D is defined by the ray passing from the fovea center and through pupil 326, where both the fovea center and the pupil are confined to a fixed orbit. As the gaze direction shifts, so too does the position of the fovea in the frame of reference of the display device. In order to track the fovea and thereby enable the methods herein, display device 102 of FIG. 1 includes a position sensor 138. The position sensor is configured to furnish a position signal that varies in dependence on the position of the fovea of an eye. Operationally, the position signal varies in dependence on the angle $\varphi$ separating the gaze direction D from the optical axis A. In FIG. 3A, the illustrated angle $\varphi$ is an azimuth angle; the skilled reader will appreciate that A and D are also separated by an elevation angle $\theta$ corresponding to rotation of D in and out of the page. In examples in which the position sensor senses both horizontal and vertical rotation of the fovea, the position signal encodes both azimuth and elevation angles or any suitable surrogates. The form or data structure of the position signal is not particularly limited.

Figure 4:
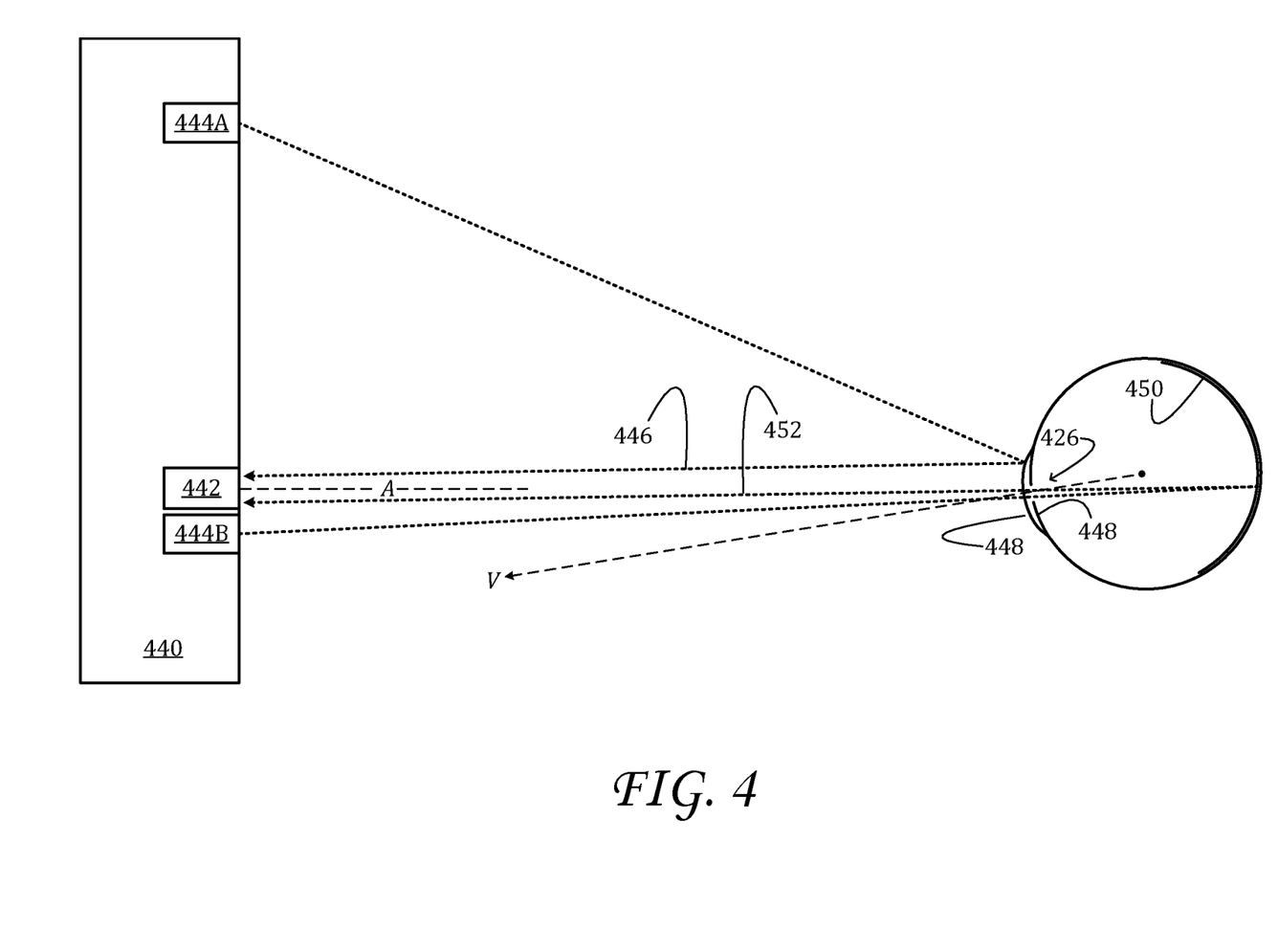
FIG. 4 shows aspects of an example eye-imaging system used to sense a fovea position of a human eye.

FIG. 4 shows aspects of an example position sensor in the form of an eye-imaging system 440. In some examples the eye-imaging system may be used also to track pupil positions for highly accurate 3D rendering, to accommodate a range of users with different interpupilary distances, or to support display calibration, for instance.

Eye-imaging system 440 includes, for each monocular system, an eye-imaging video camera 442, an on-axis lamp 444A and an off-axis lamp 444B. Each lamp may comprise a light-emitting diode (LED) or diode laser, for example, which emits infrared (IR) or near-infrared (NIR) illumination in a high-sensitivity wavelength band of the eye-imaging video camera.

The terms 'on-axis' and 'off-axis' refer to the direction of illumination of the eye with respect to the optical axis A of eye-imaging video camera 442. As shown in FIG. 4, off-axis illumination may create a specular glint 446 that reflects from the user's cornea 448. Off-axis illumination may also be used to illuminate the eye for a 'dark pupil' effect, where pupil 426 appears darker than the surrounding iris 448. By contrast, on-axis illumination from an IR or NIR source may be used to create a 'bright pupil' effect, where the pupil appears brighter than the surrounding iris. More specifically, IR or NIR illumination from on-axis lamp 444A may illuminate the retroreflective tissue of the retina 450, which reflects the illumination back through the pupil, forming a bright image 452 of the pupil. Image data from eye-imaging video camera 442 is conveyed to associated logic of computer 108. There, the image data may be processed to resolve such features as one or more glints from the cornea, or the pupil outline. The coordinates of such features in the image data may be used as input parameters in a model—e.g., a polynomial model—that relates feature coordinates to the fovea center, pupil center, gaze direction, etc. The eye-imaging system may be used to sense relatively long-timescale pupillary movement associated with changing gaze vector or accommodation (when enacted concurrently in the right and left monocular systems) as well as relatively short-timescale saccadic movement. The eye-imaging system may also be used to sense nictitation. In other configurations, the fovea position, pupil position, and/or gaze direction may be determined, estimated, or predicted in various other ways—e.g., using an electrooculographic sensor in lieu of ocular imaging.

Returning again to FIG. 1, display device 102 includes, in addition to position sensor 138, a brightness sensor 154. The brightness sensor is configured to furnish a brightness signal that varies in dependence on the brightness external to the near-eye display system (i.e., ambient brightness). In some examples the brightness sensor may respond to the combined brightness of the ambient plus the display image. The functional dependence of the brightness signal on the ambient brightness is not particularly limited. In some examples, the brightness signal may be a linear function of the radiant power or photon flux incident on the brightness sensor. In other examples, the brightness signal may be a logarithmic function of the radiant power or photon flux. In AR examples in which the position sensor comprises an eye-imaging system, low latency of pupil accommodation can be leveraged as an indicator of brightness. Thus, the brightness sensor may take the form of eye-imaging system 440 of FIG. 4, with downstream logic to return an estimate of the pupil diameter. In other examples, the brightness sensor may take the form of a photodiode arranged on the display device. In display devices that include a world-facing vision system (vide infra), the function of the brightness sensor may be enacted via the world-facing vision system.

Computer 108 is coupled operatively to the image projector and configured to cause the image projector to restrict the color image to a range of angles that varies in dependence on the position signal and on the brightness signal, such that when the brightness is below a predetermined threshold the color image is confined to the retinal target area. More generally, the computer may enact any, some, or all aspects of the method immediately below.

Figure 5:
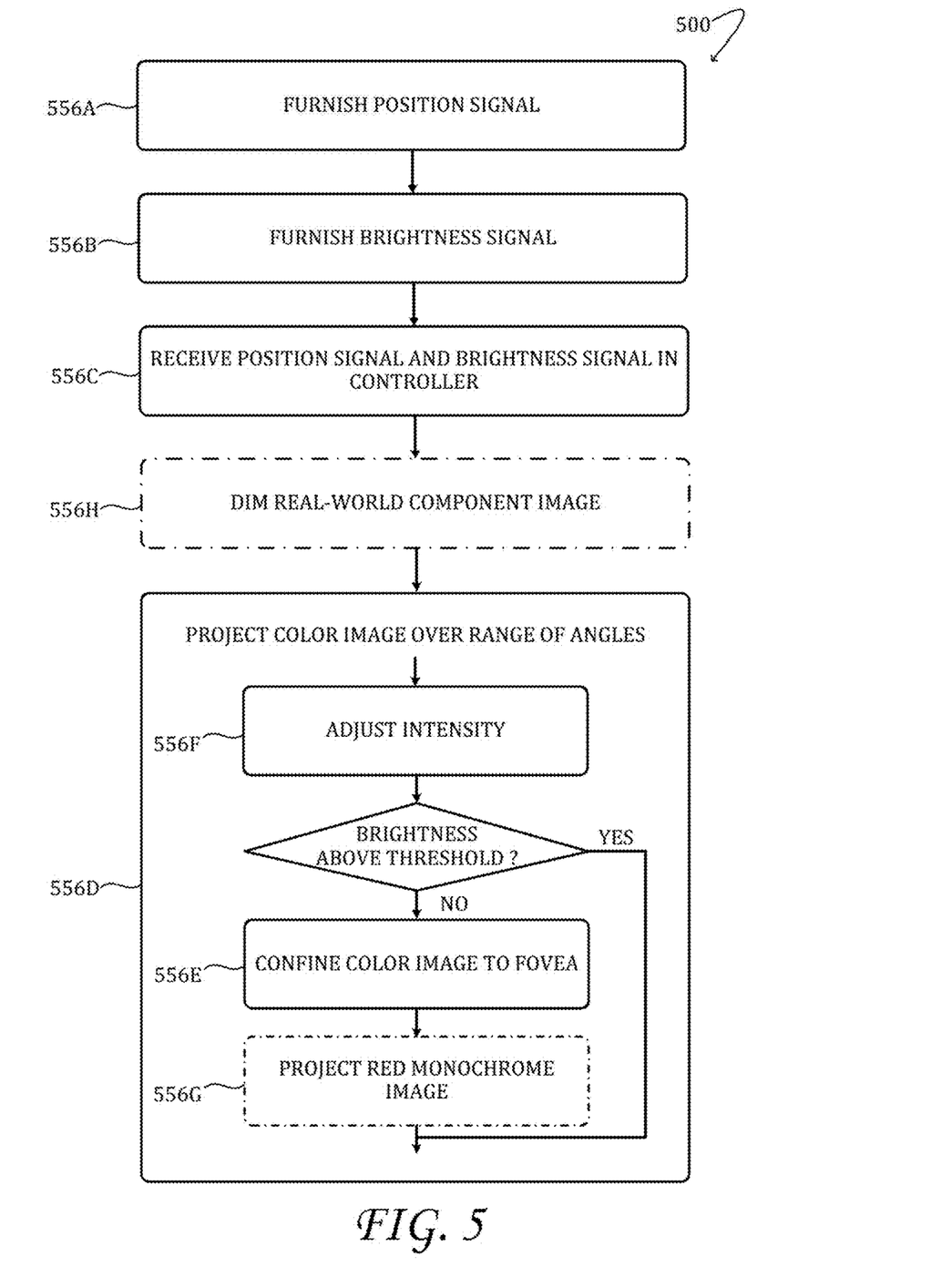
FIG. 5 shows aspects of an example method of operation of a display device for controlling brightness adaptation.

FIG. 5 shows aspects of an example method 500 of operation of a display device for controlling brightness adaptation. At 556A of method 500, a position sensor of the display device furnishes a position signal that varies in dependence on a position of a fovea of an eye. At 556B a brightness sensor of the display device furnishes a brightness signal that varies in dependence on brightness external to the display device. In some examples the brightness signal may be furnished based on a diameter of a pupil of the eye, as noted above.

At 556C the position signal and the brightness signal are received in a computer of the display device. At 556D the near-eye display system projects a color image into the eye over a range of angles that varies in dependence on the position signal and on the brightness signal. More particularly, the range of angles is selected such that when the brightness external to the near-eye display system is below a predetermined threshold, the color image, at 556E, is confined to the retinal target area, such as the fovea. The predetermined threshold may be a dark-adaptive protection threshold. In some examples the predetermined threshold may be a function of the application context and/or other conditions or sensory inputs.

By way of illustration, FIG. 3A shows parallel rays $P_1$ and $P_2$ that may emerge from the expansion optic of an image projector of a near-eye display system. The computer controls the angle of those rays with respect to optical axis A such that any ray passing through pupil 226 is focused by the crystalline lens to the same point on fovea 344. To that end, the computer processes the position signal, which defines the position of the fovea as sensed. Such processing is enacted in view of the known or predictable refractive properties of the crystalline lens. Operationally, the manner of controlling the angle of parallel rays $P_1$ and $P_2$ depends on the detailed configuration of the near-eye display system. With SLM-based monocular systems as illustrated in FIG. 2, the lowest-angle rays originate from elements at the center of the SLM matrix, and higher-angle rays originate from elements towards the periphery. Thus, if the user were looking straight ahead, the computer would confine the color image to the retinal target area by causing the SLM to direct light from elements near the center of the matrix into the collection optics, while light from elements far from the center would escape the collection optics. In the general case, where the user is not necessarily looking straight ahead, the locus of elements directing into the collection optics would be shifted up or down and left or right across the matrix, in dependence on the position signal. With a scanned-beam laser projector, the laser would be turned on only when the angle of the beam falls within a range of angles computed based on the position signal, according to the same principles hereinabove.

Generally speaking, the degree of confinement of the color image may be selected based on the application or usage scenario, and further based on the details of the configuration (e.g., accuracy and/or latency of the position and brightness sensors). In some examples, projecting the color image confines the color image to within two degrees of the center of the fovea, to within one degree of the center of the fovea, or to within one-half degree of the center of the fovea, as desired. In some examples, projecting the color image confines the color image to the parafovea—defined typically as the area within 5 degrees (10 degrees diametrically) of the center of the fovea. In some examples, the color image is projected onto one eye only, to keep the other eye maximally dark-adapted. Conversely, when the brightness is above the threshold, the color image may extend outside the retinal target area. In other words the color image may extend to ±75 degrees of the fovea center, so that the user has full benefit of color-image display with no undesired effects.

Figure 6:
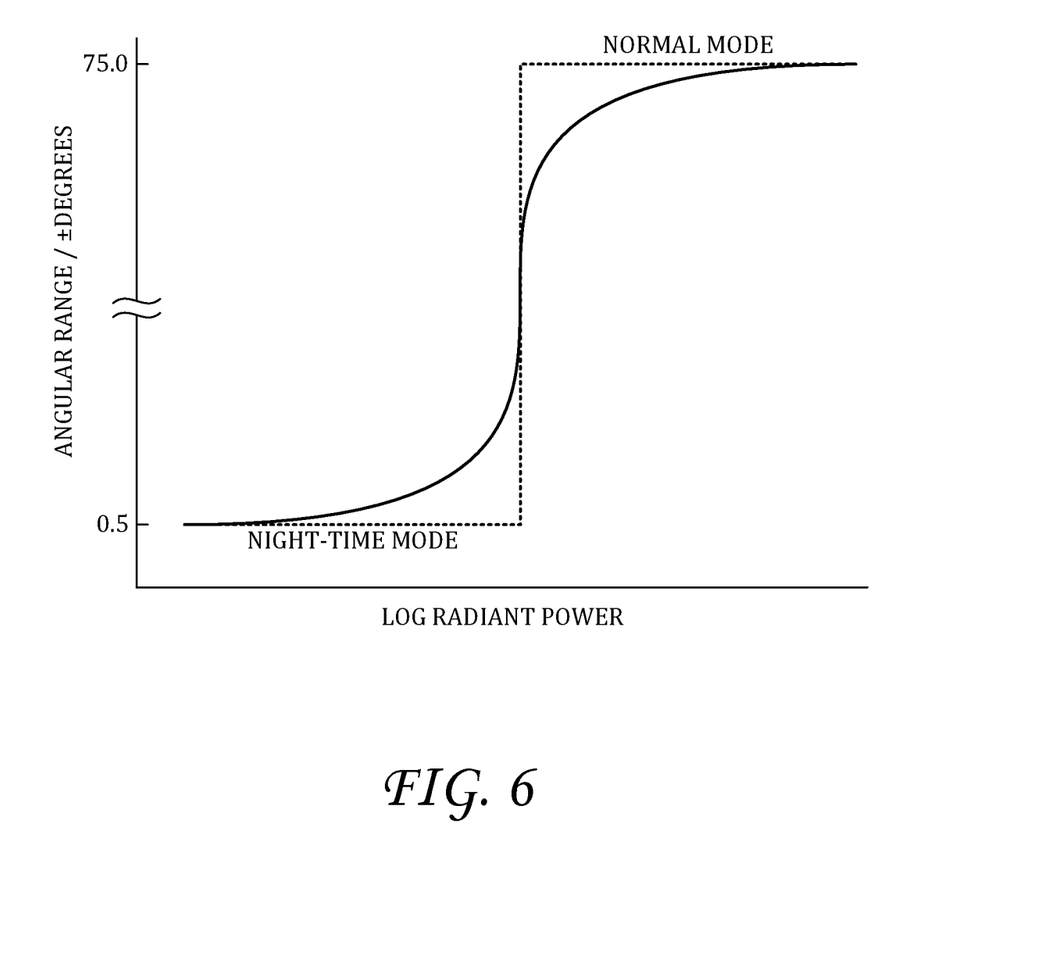
FIG. 6 is an overlay of example graphs of angular content of virtual display imagery as functions of ambient brightness.

In some examples, the dark adaptation threshold hereinabove discriminates between a discreet night-time mode where the color image is confined to the retinal target area, and, a discrete normal mode where the color image extends over the available FOV. In other examples, the angular content of the color display projection may vary from the smallest practical angular interval at limiting low brightness to the entire FOV at limiting high brightness. The function mapping angular content to brightness may be sigmoidal, as shown by example in FIG. 6, overlaid on the step function characterizing the discrete-thresholding variant. In some scenarios, a smoother transition between modes may seem more natural to the user.

Returning now to FIG. 5, in some examples, the act of projecting the color image includes, at 556F, adjusting the intensity of the color image in dependence on the brightness signal. More particularly, the intensity may be increased with increasing ambient brightness to provide a more comfortable visual experience for the user across different operating scenarios. At 556G, optionally, a red-monochrome image may be projected into the eye. In some examples, the red-monochrome image may derive from narrow-band (e.g., laser) light of a wavelength greater than 620 nm. The angular content of the red-monochrome image, in examples in which it is employed, need not be constrained like that of the full-color image, because the user's rods (located outside of the fovea) are substantially insensitive to red light. In some examples the red-monochrome image is projected at a threshold intensity for scotopic peripheral vision. In some examples the red-monochrome image is projected onto one eye only, to keep the other eye maximally protected. In examples in which the pupil diameter is used as an indication of brightness, one or more of the range angular content of the full-color image, the intensity of any red-monochrome image, or the number of eyes receiving the full-color projection may be varied in a closed-loop manner based on the diameter of the pupil. In some examples, the angular content of the full-color image may increase with decreasing pupil size, as dark adaptation becomes less important. Likewise, in some examples the intensity of the red-monochrome image may increase with decreasing pupil size. In some examples, the full-color image is projected into both eyes when the pupils are smaller than a threshold diameter but projected into only one eye when the pupils are larger than the threshold diameter. Naturally, any combination of the above may also be enacted.

Indeed, no aspect of the drawings or description should be interpreted in a limiting sense, because numerous variations, extensions, and omissions are also envisaged. For instance, method 500 may include an optional step 556H in which a real-world image component is dimmed by a factor that varies in dependence on the brightness signal. This approach may be used to preemptively aid dark adaptation. Accordingly, in AR display device 102 of FIG. 1, dimming screen 158 is coupled operatively to computer 108. In some examples, the dimming screen is a low-pass filter that dims only non-red wavelengths which affect dark adaptation of the rods, leaving the red component image undimmed, to avoid unnecessary loss of visibility.

Furthermore, in addition to furnishing the brightness signal, a display device may furnish other signals, such as time or location, which can indicate that user is likely, at some point in the future, to remove the display device in darkness. In a display device so configured, the computer may apply a suitable heuristic to restrict the color image to the retinal target area even before the ambient brightness falls below the dark-adaptation threshold. Such logic is based on the principle that it is better to support dark adaptation pre-emptively, under some conditions (even at the expense of display quality) when loss of night vision would be very disadvantageous.

Figure 7:
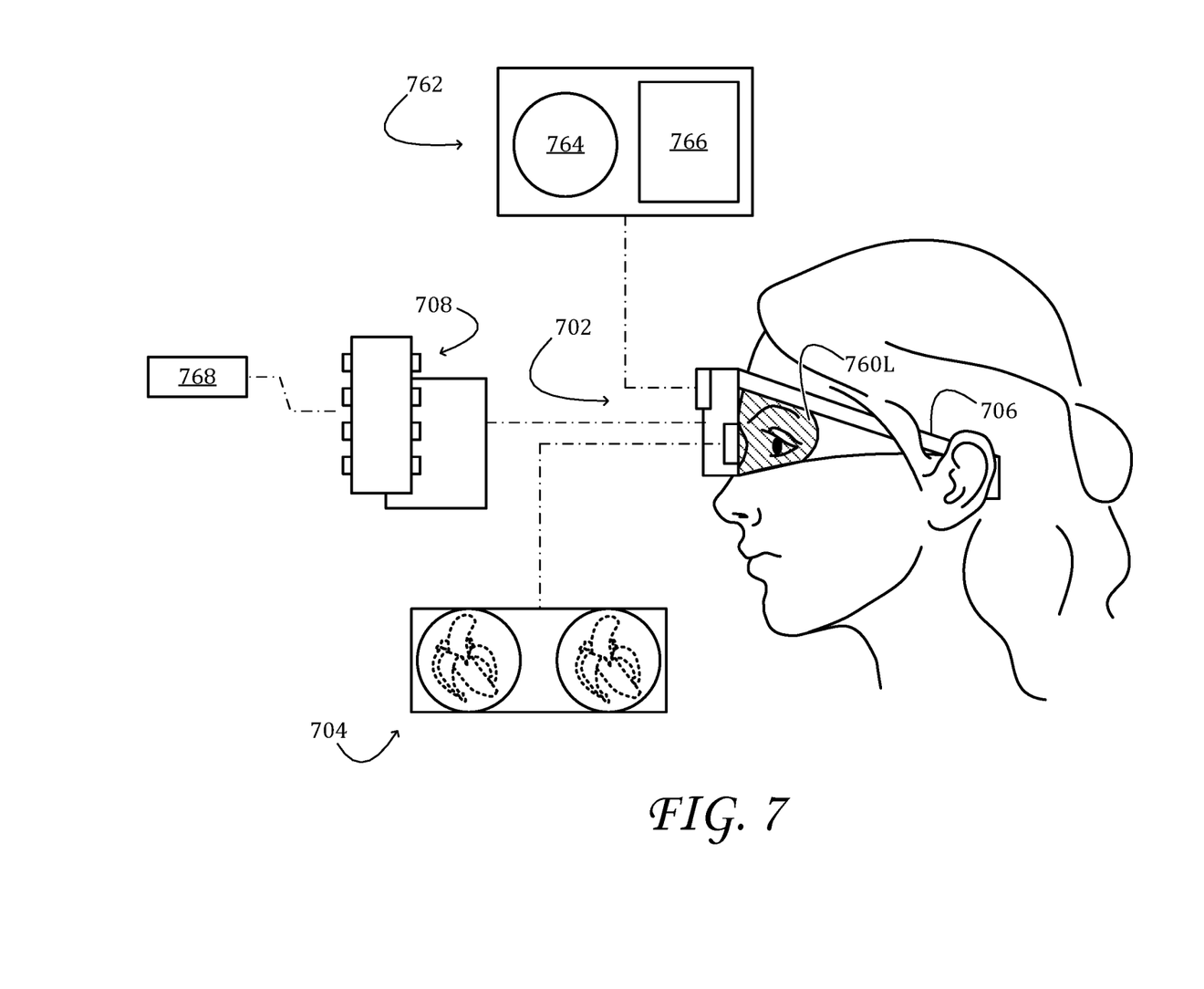
FIG. 7 shows aspects of another example display device.

Although the description makes frequent reference to AR display devices, it will be emphasized that the methods herein can also be implemented on a fully immersive VR display device, such as that of FIG. 7. Display device 702 of FIG. 7 includes left side shield 760L (and complementary right side shield not shown in FIG. 7). Each side shield is configured to block ambient light from reaching the user's eyes when the user is wearing frame 706. The light-blocking feature is important for providing an immersive VR experience, especially when virtual imagery of relatively low brightness is presented. In examples where near-eye display system 704 is substantially opaque, side shields 760 block ambient light primarily from peripheral directions. In some examples a side shield may follow the contour of the user's face and be called a 'face gasket'. In other examples the display device may have a differently configured side shield or no side shield at all.

Display device 702 includes a world-facing vision system 762 coupled to frame 706 and configured to provide pass-thru video to near-eye display system 704. In this example the world-facing vision system furnishes feed-thru video to computer 708. As in the previous example, the computer controls how the color image is generated, but here the color image is an admixture of virtual imagery superposed on the feed-thru video. To that end the world-facing vision system includes at least one world-facing video camera 764 configured to acquire video of the scene in front of the display device. More specifically, the world-facing video camera may have an optical axis oriented in the forward direction and an FOV spanning about ±50 horizontal degrees and about ±40 vertical degrees relative to the optical axis. Wider and narrower FOVs are equally contemplated.

World-facing vision system 762 includes video-mix engine 766. The video-mix engine is configured to mix the video from the world-facing video camera with virtual imagery from hologram engine 768 of computer 708. In this manner the vision system is configured to simulate an AR experience, based on the pass-thru video from the world-facing video camera, augmented by the virtual imagery from the hologram engine.

Additional contextual description is now provided for the operation of the near-eye display systems herein. Returning briefly to FIG. 2, each display image formed by monocular system 214 is a virtual image presented at a predetermined distance $Z_0$ in front of user O. The distance $Z_0$ is referred to as the 'depth of the focal plane' of the display image. In some monocular systems, the value of $Z_0$ is a fixed function of the design parameters of image projector 218, entry grating 230, exit grating 232, and/or other fixed-function optics. Based on the permanent configuration of these structures, the focal plane may be positioned at a desired depth. In one example, $Z_0$ may be set to 'infinity', so that each optical system presents a display image in the form of collimated light rays. In another example, $Z_0$ may be set to 33 centimeters, requiring the optical system to present each display image in the form of diverging light. In some examples, $Z_0$ may be chosen at design time and remain unchanged for all virtual imagery presented by the display system. Alternatively, the optical systems may be configured with electronically adjustable optical power, to allow $Z_0$ to vary dynamically according to the range of distances over which the virtual imagery is to be presented.

A binocular near-eye display system employing a fixed or variable focal plane may be capable of presenting virtual-display imagery perceived to lie at a controlled, variable distance in front of, or behind, the focal plane. This effect can be achieved by controlling the horizontal disparity of each pair of corresponding pixels of the right and left stereo images, as described below with reference to FIGS. 8A and 8B.

Figure 8A:
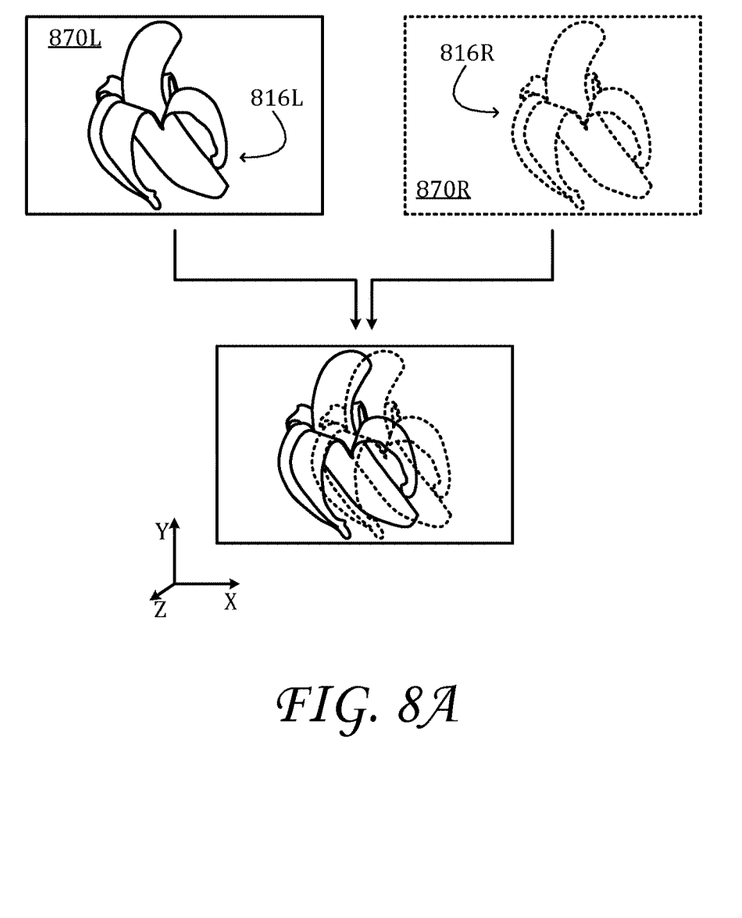
FIGS. 8A and 8B show aspects of stereoscopic display projection in a near-eye display system.

FIG. 8A shows right and left image frames 870R and 870L overlaid upon each other for ease of illustration. The right image frame encloses right display image 816R, and the left image frame encloses left display image 816L. Viewed concurrently through a near-eye display system, the right and left display images may appear to the user as 3D hologram 872, comprised of individually rendered loci. Each locus i of the visible surface of the hologram has a depth coordinate $Z_i$ associated with a corresponding pixel $(X_i, Y_i)$ of each of the right and left display images. The desired depth coordinate may be simulated as follows.

Figure 8B:
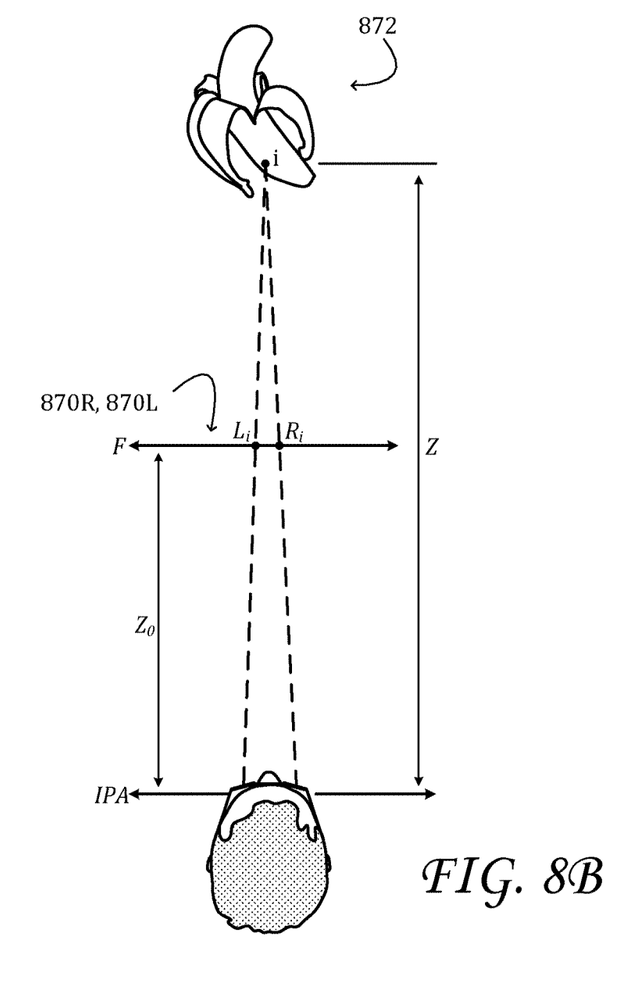

At the outset, a distance $Z_0$ to a focal plane F of the near-eye display system is chosen. Then the depth coordinate Z for every locus i of the visible surface of the hologram is set. This is done by adjusting the positional disparity of the two pixels corresponding to locus i in the right and left display images relative to their respective image frames. In FIG. 8B, the pixel corresponding to locus i in the right image frame is denoted $R_i$, and the corresponding pixel of the left image frame is denoted $L_i$. In FIG. 8B, the positional disparity is positive—i.e., $R_i$ is to the right of $L_i$ in the overlaid image frames. Positive positional disparity causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity D may be related to Z, $Z_0$, and to the interpupillary distance (IPD) of the user by $$D = IPD \times \left(1 - \frac{Z_0}{Z}\right).$$

In some examples, the computer maintains a model of the Cartesian space in front of the user, in a frame of reference fixed to the near-eye display system. The user's pupil positions are mapped onto this space, as are the image frames 870R and 870L, each positioned at the predetermined depth $Z_0$. Then, the visible surface of hologram 872 is assembled, with each locus i of the viewable surface of the imagery having coordinates $X_i$, $Y_i$, and $Z_i$, in the common frame of reference. For each locus of the visible surface, two-line segments are constructed—a first line segment to the pupil position of the user's right eye and a second line segment to the pupil position of the user's left eye. The pixel $R_i$ of the right display image, which corresponds to locus i, is taken to be the intersection of the first line segment in right image frame 870R. Likewise, the pixel $L_i$ of the left display image is taken to be the intersection of the second line segment in left image frame 870L. This procedure automatically provides the appropriate amount of shifting and scaling to correctly render the visible surface, placing every locus i at the appropriate distance and with the appropriate perspective. In some examples, the approach outlined above may be facilitated by real-time estimation of the user's pupil positions. In examples in which pupil estimation is not attempted, a suitable surrogate for the pupil position, such as the center of rotation of the pupil position, or eyeball position, may be used instead.

Returning again to FIG. 2, controlling the stereo disparity of images confined to a focal plane is appropriate for rendering a three-dimensional effect, but it is less appropriate for shifting an entire display image back and forth in the user's field of view. To resolve depth in a complex scene, the human visual cortex interprets plural visual cues (e.g., occlusion and motion parallax), in addition to the neurologically coupled, oculomotor cues of binocular vergence and crystalline-lens accommodation. Stereo disparity correctly stimulates the binocular-vergence cue but does not stimulate the accommodation cue. Rather, the user's crystalline lenses remain focused on the fixed focal plane no matter the depth value indicated by the stereo disparity. When the disparity changes, but the focal plane does not move, a dissonance is perceived between the two oculomotor cues, which may result in user discomfort.

Accordingly, monocular system 214 of FIG. 2 may be configured to vary the focal plane on which virtual display imagery is presented. In the illustrated example, the monocular system includes a variable-focus lens 274 of variable optical power. The computer is configured to control the focusing bias of the variable-focus lens such that the display light is imaged onto a focal plane positioned at a controlled, variable distance from pupil position 226. In stereoscopic near-eye display systems, this control feature may be enacted in combination with appropriate control of the stereo disparity as described above. Monocular system 214 of FIG. 2 also includes a fixed-focus lens 276 in series with variable-focus lens 274 and arranged to pre-bias the vergence of the display light released from expansion optic 224.

Applied in an AR display system, variable-focus lens 274 and/or fixed-focus lens 276 would alter the vergence of the external light received from opposite the user. In FIG. 2, accordingly, monocular system 214 further comprises a variable-compensation lens 278 of variable optical power and a fixed compensation lens 280. In some examples, the fixed optical power of fixed-compensation lens 278 may oppose and substantially reverse the fixed optical power of fixed-focus lens 276. When controlling the focusing bias such that the display light is imaged onto a focal plane positioned at a controlled, variable distance from user O, the computer may also synchronously control the compensation bias of the variable compensation lens such that the external light reaches the user with unchanged vergence.

As noted above, the methods herein may be tied to a computer system of one or more computing devices. Such methods and processes may be implemented as an application program or service, an application programming interface (API), a library, and/or other computer-program product.

Figure 9:
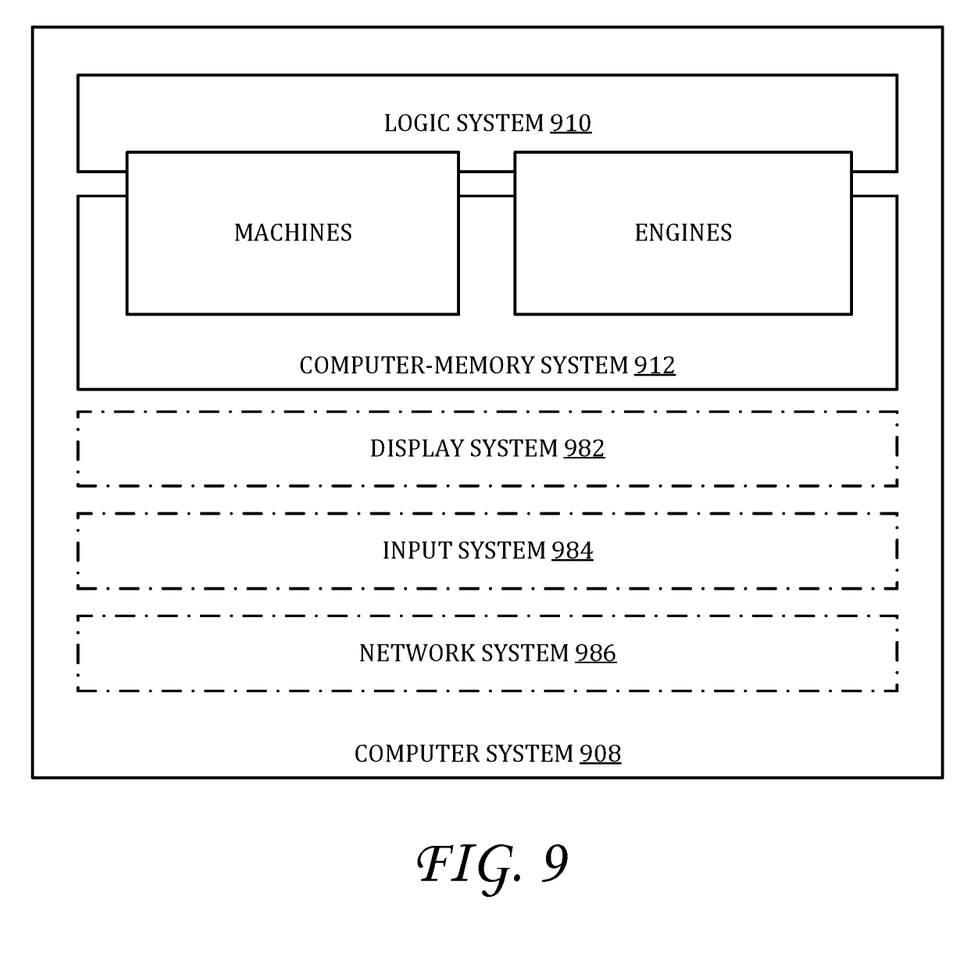
FIG. 9 shows aspects of an example computer system.

FIG. 9 provides a schematic representation of a computer system 908 configured to provide some or all of the computer system functionality disclosed herein. Computer system 908 may take the form of a personal computer, application-server computer, or any other computing device.

Computer system 908 includes a logic system 910 and a computer-memory system 912. Computer system 908 may optionally include a display system 982, an input system 984, a network system 986, and/or other systems not shown in the drawings.

Logic system 910 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 912 includes at least one physical device configured to temporarily and/or permanently hold computer system information, such as data and instructions executable by logic system 910. When the computer-memory system includes two or more devices, the devices may be collocated or remotely located. Computer-memory system 912 may include at least one volatile, nonvolatile, dynamic, static, read/write, read-only, random-access, sequential-access, location-read addressable, file-read addressable, and/or content-read addressable computer-memory device. Computer-memory system 912 may include at least one removable and/or built-in computer-memory device. When the logic system executes instructions, the state of computer-memory system 912 may be transformed—e.g., to hold different data.

Aspects of logic system 910 and computer-memory system 912 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 910 and computer-memory system 912 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 982 may be used to present a visual representation of data held by computer-memory system 912. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 984 may comprise or interface with one or more input devices. An input device may include a sensor device or a user input device. Examples of user input devices include a keyboard, mouse, or touch screen.

When included, network system 986 may be configured to communicatively couple computer system 908 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a display device comprising a position sensor configured to furnish a position signal that varies in dependence on a position of a fovea of an eye, a brightness sensor configured to furnish a brightness signal that varies in dependence on a brightness external to the display system, an expansion optic, a plurality of light emitters, an image projector, and a computer. The plurality of light emitters each emits in a different wavelength band, and the image projector is configured to project a color image into the eye by directing the emission from the plurality of light emitters through the expansion optic. The computer is coupled operatively to the image projector and configured to cause the image projector to restrict the color image to a range of angles that varies in dependence on the position signal and on the brightness signal, such that when the brightness is below a predetermined threshold the color image is confined to a retinal target area.

In some implementations, the expansion optic is a see-thru optic and the display device is an augmented-reality display device. In some implementations, the position sensor includes an eye-imaging video camera. In some implementations, the image projector comprises a spatial light modulator. In some implementations, the image projector comprises a scanned-beam laser projector. In some implementations, the brightness sensor comprises a world-facing vision system furnishing feed-thru video to the computer, and the color image is an admixture of virtual imagery superposed on the feed-thru video.

Another aspect of this disclosure is directed to a method of operation of a display device for controlling brightness adaptation. The method comprises: (a) receiving a position signal that varies in dependence on a position of a fovea of an eye; (b) receiving a brightness signal that varies in dependence on brightness external to the display device; and (c) projecting a color image into the eye over a range of angles that varies in dependence on the position signal and on the brightness signal, such that when the brightness is below a predetermined threshold the color image is confined to a retinal target area. Using the position signal in this method enables the projector to target the user's fovea even if the user shifts his or gaze while using the device. Using the brightness signal enables control logic to determine whether it is necessary to safeguard dark adaptation, or whether the display projector can be operated in full-color/full-brightness mode. By confining the color image to the retinal target area the user is prevented from experiencing night blindness in the scenario in which the display device is removed under dark conditions.

In some implementations, the color image extends outside the retinal target area when the brightness is above the threshold. In some implementations, the method further comprises adjusting an intensity of the color image in dependence on the brightness signal. In some implementations, the method further comprises projecting a red-monochrome image into the eye. In some implementations, the red-monochrome image is projected at a threshold intensity for scotopic peripheral vision. In some implementations, the red-monochrome image is projected into one eye only. In some implementations, projecting the color image confines the color image to within two degrees of a center of the fovea. In some implementations, the color image is projected into one eye only. In some implementations, the method further comprises furnishing the brightness signal based on a diameter of a pupil of the eye. In some implementations, one or more of the range of angles, an intensity of a red-monochrome image, and a number of projection-receiving eyes is varied in a closed-loop manner based on the diameter of the pupil. In some implementations, the method further comprises dimming a real-world image component by a factor that varies in dependence on the brightness signal. In some implementations, the real-world image component is a non-red image component.

Another aspect of this disclosure is directed to a see-thru, near-eye display device comprising a position sensor configured to furnish a position signal that varies in dependence on a position of a fovea of an eye, a brightness sensor configured to furnish a brightness signal that varies in dependence on brightness external to the display device, a see-thru expansion optic, a plurality of lasers, a spatial light modulator, and a computer. The plurality of lasers each emits in a different wavelength band, and the spatial light modulator is configured to project a color image into the eye by directing the emission from the plurality of lasers through the expansion optic. The computer is coupled operatively to the spatial light modulator and configured to cause the spatial light modulator to restrict the color image to a range of angles that varies in dependence on the position signal and on the brightness signal, such that when the brightness is below a predetermined threshold the color image is confined to a retinal target area. In some implementations, the color image extends outside the retinal target area when the brightness signal is above the threshold.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
a position sensor configured to furnish a position signal that varies in dependence on a position of a fovea of an eye;
a brightness sensor configured to furnish a brightness signal that varies in dependence on a brightness external to the display device;
an expansion optic;
a plurality of light emitters each emitting in a different wavelength band;
an image projector configured to project a color image into the eye by directing the emission from the plurality of light emitters through the expansion optic; and
a computer coupled operatively to the image projector and configured to cause the image projector to restrict the color image to a range of angles that varies in dependence on the position signal and on the brightness signal, such that when the brightness signal is below a predetermined threshold, the color image is confined to the fovea of the eye by the image projector using the position signal, and such that when the brightness signal is above the predetermined threshold, the color image extends from a center of the fovea to outside the fovea.

2. The display device of claim 1 wherein the expansion optic is a see-thru expansion optic and the display device is an augmented-reality display device.

3. The display device of claim 1 wherein the position sensor includes an eye-imaging video camera.

4. The display device of claim 1 wherein the image projector comprises a spatial light modulator.

5. The display device of claim 1 wherein the image projector comprises a scanned-beam laser projector, wherein restricting the color image to the range of angles comprises turning on the scanned-beam laser projector when an angle of a beam from the scanned-beam laser projector falls within the range of angles.

6. The display device of claim 1 wherein the brightness sensor comprises a world-facing vision system furnishing feed-thru video to the computer, wherein the color image comprises virtual imagery superposed on the feed-thru video.

7. A method of operation of a display device for controlling brightness adaptation, the method comprising:
receiving a position signal that varies in dependence on a position of a fovea of an eye;
receiving a brightness signal that varies in dependence on brightness external to the display device; and
projecting a color image into the eye over a range of angles that varies in dependence on the position signal and on the brightness signal, such that when the brightness signal is below a predetermined threshold, the color image is confined to the fovea of the eye using the position signal, and such that when the brightness signal is above the predetermined threshold, the color image extends from a center of the fovea to outside the fovea.

8. The method of claim 7 further comprising adjusting an intensity of the color image in dependence on the brightness signal.

9. The method of claim 7 further comprising projecting a red-monochrome image into the eye.

10. The method of claim 9 wherein the red-monochrome image is projected at a threshold intensity for scotopic peripheral vision.

11. The method of claim 9 wherein the red-monochrome image is projected into one eye only.

12. The method of claim 7 wherein projecting the color image confines the color image to within two degrees of the center of the fovea when the brightness signal is below the predetermined threshold.

13. The method of claim 7 wherein the color image is projected into one eye only.

14. The method of claim 7 further comprising furnishing the brightness signal based on a diameter of a pupil of the eye.

15. The method of claim 14 wherein one or more of the range of angles, an intensity of a red-monochrome image, and a number of projection-receiving eyes is varied in a closed-loop manner based on the diameter of the pupil.

16. The method of claim 7 further comprising dimming a real-world image component by a factor that varies in dependence on the brightness signal.

17. The method of claim 16 wherein the real-world image component is a non-red image component.

18. A see-thru, near-eye display device comprising:
a position sensor configured to furnish a position signal that varies in dependence on a position of a fovea of an eye;
a brightness sensor configured to furnish a brightness signal that varies in dependence on brightness external to the display device;
a see-thru expansion optic;
a plurality of lasers each emitting in a different wavelength band;
a spatial light modulator configured to project a color image into the eye by directing the emission from the plurality of lasers through the expansion optic; and
a computer coupled operatively to the spatial light modulator and configured to cause the spatial light modulator to restrict the color image to a range of angles that varies in dependence on the position signal and on the brightness signal, such that when the brightness signal is below a predetermined threshold, the color image is confined to the fovea of the eye using the position signal, and such that when the brightness signal is above the predetermined threshold, the color image extends from a center of the fovea to outside the fovea.

19. The see-thru, near-eye display device of claim 18, wherein the color image is confined to within two degrees of the center of the fovea when the brightness signal is below the predetermined threshold.

* * * * *